Figure 1:
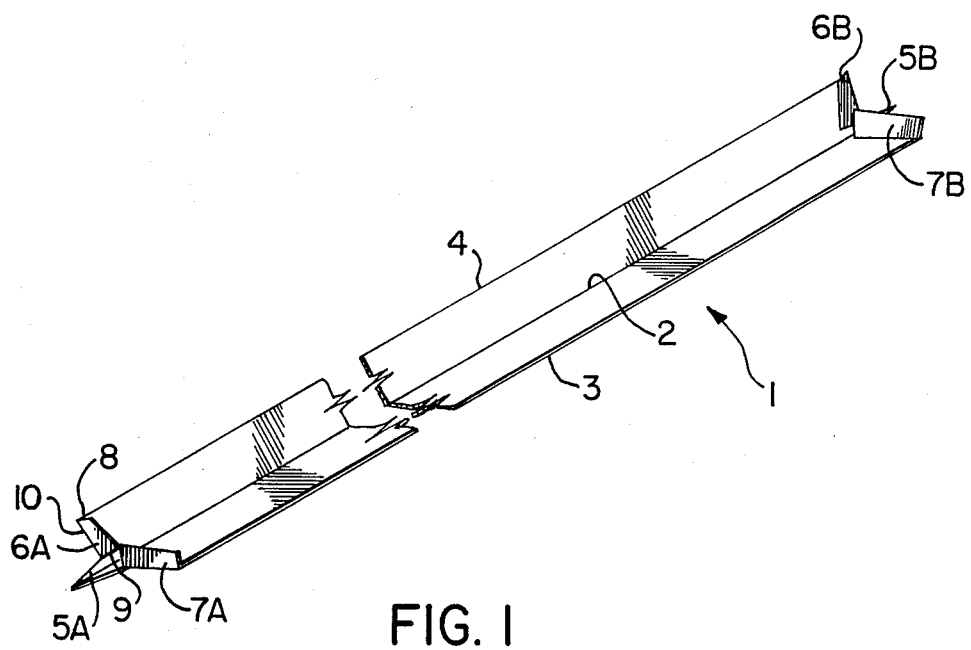

United States Patent [19]

Breadner

[11] Patent Number: 4,918,860
[45] Date of Patent: Apr. 24, 1990

[54] TREE BRANCH SPREADER

[76] Inventor: Dennis Breadner, R.R. #1, Clarksburg, Ontario N0H 1J0, Canada

[21] Appl. No.: 349,491

[22] Filed: May 9, 1989

[51] Int. Cl.⁵ ............................................ A01G 17/04
[52] U.S. Cl. ........................................................ 47/42
[58] Field of Search .............................. 47/4, 42, 43, 8; 248/351, 357; 52/695

[56] References Cited

U.S. PATENT DOCUMENTS

| | | | |
|---|---|---|---|
| 1,212,172 | 1/1917 | Beckner | 52/695 |
| 3,018,522 | 1/1962 | Reidelbach | 52/695 |
| 4,377,053 | 3/1983 | Roark | 47/42 |
| 4,649,665 | 3/1987 | McBride | 47/42 |

FOREIGN PATENT DOCUMENTS

| | | | |
|---|---|---|---|
| 1158104 | 5/1985 | U.S.S.R. | 47/42 |
| 1441394 | 6/1976 | United Kingdom | 52/695 |

Primary Examiner—David A. Scherbel
Assistant Examiner—Jerrold D. Johnson
Attorney, Agent, or Firm—Larson and Taylor

[57] ABSTRACT

A fixed length tree spreading device comprising a shaft provided with engagement members at each of its ends, wherein the shaft comprises an elongate member of thin sheet strip having an L-cross section in which each limb of the L-cross section is approximately the same length and wherein the included angle is from about 90° to about 110°, and wherein the engagement members comprises two tabs, one on each limb of the (tree) L-cross section each at substantially 90° to each limb of the L-cross section together with a short protruding spike member there between substantially in line with the angle of the shaft.

5 Claims, 1 Drawing Sheet

TREE BRANCH SPREADER

This invention is concerned with devices for the spreading and training of tree branches and the like.

In the growing of fruit and flower trees, and other ornamental trees and shrubs there is often a need for the grower to be able to position the branches thereof into a desired pattern, rather than simply to leave their growth to proceed unattended. For free standing trees, such as apple or other fruit trees, this can be achieved by placing a spreader between a given branch and the trunk (or a lower branch).

Various devices have been proposed to effect this. In U.S. Design Pat. No. 38,268 McIntyre describes a ground engaging tree prop, which can be used on lower branches. In U.S. Design Pat. No. 221,459, Wolf et al describe a complex tree branch spreader, which is adjustable in overall length. This spreader would require several mouldings (if is made in plastics) or castings for its construction. This device uses a central spike formed in the center of a U-shaped member to provide lodgment against the tree trunk or branch. Similarly, in U.S. Pat. No. 4,377,053 Roarck et al also describe an adjustable spreader which is also relatively complicated, being made of two tube pieces, each of which have various exterior raised portions. Rotation of one tube relative to the other permits engagement and disengagement of these portions, plus permitting adjustment of the spreader length. In U.S. Pat. No. 4,649,665 there is described a non-adjustable spreader. A relatively thick bar is used, which has a specially shaped chisel-like end, composed of a row of teeth so situated as to engage with a tree branch. These teeth are also angled relative to the length of the spreader. It seems that this device has several disadvantages. The square section bar must be of reasonably generous dimensions in order to provide enough face area for the chisel like teeth to be formed. Engagement of this arcuate row of teeth into the tree back could cause significant damage to the very important regions of the branch immediately inside the bark (the cambium). Furthermore, the chisel-like end also has to be at a set angle relative to the length of the tree spreader, which limits the angular range over which it will engage a branch.

It has now been discovered that a very simple and efficient tree spreader can be fabricated from relatively light weight sheet metal strip, and which also causes minimum damage to the surface of the tree.

Thus this invention comprises a fixed length tree spreading device comprising a shaft provided with engagement means at each of its ends, wherein the shaft comprises an elongate member of thin sheet strip having an L-cross section, in which each limb of the L-cross section is approximately the same length and the included angle is from about 90° to about 110°, and wherein the engagement means comprises two upstanding tabs, one on each limb of the L-cross section, each at substantially 90° to (the shaft) each limb of the L-cross section, together with a short protruding spike member therebetween, substantially in line with the angle of the shaft.

In a preferred embodiment, the tree spreading device comprises a steel strip which has been cut and bent to provide the required shape.

The invention will now be described by way of reference to FIG. 1. This figure represents the embodiment wherein the spreader is fabricated from sheet strip, for example galvanized sheet. The spreader shown generally at 1 comprises a shaft bent along the axis 2 into an L-shape. The included angle between the angled sides 3, 4 is not critical, a value of about a right angle being suitable. A value in the range of from about 90° to about 110° is acceptable. At each end of the strip two short cuts are made, thereby forming the short spikes 5A and 5B. Either side of the spike, pairs of tabs 6A, 7A and 6B, 7B are bent up to provide a lodgment surface against the tree branch. In these tab pairs, the outer edge 8 is preferably shorter than the inner edge 9 (which is the length of the spike 5). This is obtained by ensuring that the bend line 10 for the tabs is not at a right angle to the edge of the strip. By so doing an included angle is provided between the tab faces, so that the end of the spreader represents a Vee-notch with the spike in its center.

The dimensions suitable for the spreader will depend upon the intended use. For orchard use with fruit trees, the following dimensions have been found suitable. Generally, the spike is about 5 mm in length, with the inner longer tab edge having a height also of about 5 mm. For a short spreader, 15 cms to 20 cms in length, relatively light gauge metal can be used; a thickness of 28 gauge has been found adequate, with strip width of about 16 mm. For a longer spreader, for example a length of 60 cms, heavier and wider strip is used: for example a 22 gauge strip of about 23 mm width can be used. There is considerable choice of materials for the spreader. Strip galvanized sheet is both suitable, and freely available.

I claim:

1. A fixed length tree spreading device comprising a shaft provided with engagement means at each of its ends, wherein the shaft comprises an elongate member of thin sheet strip having an L-cross section in which each limb of the L-cross section is approximately the same length and wherein the included angle between the limbs is from about 90° to about 100°; and wherein each engagement means comprises two upstanding tabs, one on each limb of the L-cross section, together with a short protruding spike member therebetween substantially in line with the angle of the shaft.

2. A device according to claim 1 wherein the thin sheet strip is galvanized steel.

3. A device according to claim 1 wherein the included angle between each of the tabs and the contiguous limb of the L-cross section is substantially 90°.

4. A device according to claim 1 wherein the included angle between each of the tabs and the contiguous inner face of the limb of the L-cross section is substantially 90°.

5. A device according to claim 1 wherein in each tab the outer edge is shorter than the inner edge adjacent the spike; and wherein the included angle between each of the tabs and the contiguous inner face of the limb of the L-cross section is substantially 90° whereby the engagement means comprises a substantially Vee-shaped notch having the spike in its center.

* * * * *